(12) United States Patent
Cui et al.

(10) Patent No.: US 11,604,849 B2
(45) Date of Patent: Mar. 14, 2023

(54) RENDERING METHOD, ELECTRONIC DEVICE AND STORAGE MEDIUM

(71) Applicant: BEIJING XIAOMI MOBILE SOFTWARE CO., LTD., Beijing (CN)

(72) Inventors: Baoqiu Cui, Beijing (CN); Junjie Dong, Beijing (CN); Hua Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/383,835

(22) Filed: Jul. 23, 2021

(65) Prior Publication Data
US 2022/0237256 A1    Jul. 28, 2022

(30) Foreign Application Priority Data
Jan. 25, 2021  (CN) .......................... 202110093187.4

(51) Int. Cl.
*G06F 17/00*     (2019.01)
*G06F 16/958*    (2019.01)
(Continued)

(52) U.S. Cl.
CPC ........ *G06F 16/986* (2019.01); *G06F 16/9027* (2019.01); *G06F 16/957* (2019.01); *G06T 13/80* (2013.01)

(58) Field of Classification Search
CPC .... G06F 16/9027; G06F 16/957; G06T 13/80
(Continued)

(56) References Cited

U.S. PATENT DOCUMENTS 8,294,704 B1    10/2012  Garrity
9,164,874 B1 *  10/2015  Tomay .................. G06F 11/366
(Continued)

FOREIGN PATENT DOCUMENTS

CN    102306174 A    1/2012
CN    105096368 A    11/2015
(Continued)

OTHER PUBLICATIONS

Kovacevic, Recognition of Common Areas in a Web Page Using Visual Information: a possible application in a page classification, IEEE (Year: 2002).*
(Continued)

*Primary Examiner* — Stephen S Hong
*Assistant Examiner* — Matthew J Ludwig
(74) *Attorney, Agent, or Firm* — Lathrop GPM LLP

(57) ABSTRACT

A rendering method, rendering apparatus implementing said rendering method, an electronic device implementing said rendering method, and a storage medium implementing said rendering method includes: obtaining data of a page to be processed; extracting a plurality of page elements from the data of the page to be processed; obtaining content and a plurality of attributes of each page element of the plurality of page elements; generating a plurality of rendering object sets, each rendering object set corresponding to each page element based on the content and the plurality of attributes of the respective page element, each rendering object set including a plurality of rendering objects; generating a rendering tree based on a plurality of rendering object sets corresponding respectively to the plurality of page elements; and performing a rendering process based on the rendering tree.

14 Claims, 5 Drawing Sheets

(51) Int. Cl.
  *G06F 16/957* (2019.01)
  *G06F 16/901* (2019.01)
  *G06T 13/80* (2011.01)
(58) Field of Classification Search
  USPC ........................................................ 715/234
  See application file for complete search history.

(56) References Cited

U.S. PATENT DOCUMENTS

| | | | | |
|---|---|---|---|---|
| 11,137,985 | B2* | 10/2021 | Schoppe | G06T 11/60 |
| 2003/0058260 | A1* | 3/2003 | Ohshima | H04N 1/393 |
| | | | | 345/666 |
| 2006/0232589 | A1* | 10/2006 | Glein | G06T 13/00 |
| | | | | 345/473 |
| 2008/0120129 | A1* | 5/2008 | Seubert | G06Q 40/125 |
| | | | | 705/305 |
| 2008/0229189 | A1* | 9/2008 | Martinsen | G06F 16/986 |
| | | | | 715/234 |
| 2008/0263432 | A1* | 10/2008 | Newcomb | G06F 3/016 |
| | | | | 715/200 |
| 2008/0278482 | A1* | 11/2008 | Farmanbar | G06T 17/005 |
| | | | | 345/419 |
| 2012/0110480 | A1* | 5/2012 | Kravets | G06F 16/9577 |
| | | | | 715/760 |
| 2014/0053059 | A1* | 2/2014 | Weber | G06F 40/10 |
| | | | | 715/234 |
| 2015/0279058 | A1* | 10/2015 | Dong | G06F 40/143 |
| | | | | 345/582 |
| 2015/0356195 | A1* | 12/2015 | Kilzer | H04N 5/85 |
| | | | | 715/234 |
| 2017/0249287 | A1* | 8/2017 | Thayer | G06F 40/143 |
| 2018/0032489 | A1* | 2/2018 | Zhou | G06F 16/9577 |
| 2018/0343179 | A1* | 11/2018 | VanBlon | H04L 67/148 |
| 2018/0343201 | A1* | 11/2018 | Peterson | H04L 47/125 |
| 2019/0355325 | A1 | 11/2019 | Xu et al. | |
| 2019/0371049 | A1* | 12/2019 | Hsieh | G06T 15/60 |
| 2021/0089619 | A1* | 3/2021 | Bhuyan | G06F 40/117 |

FOREIGN PATENT DOCUMENTS

| | | |
|---|---|---|
| CN | 105096368 B | 3/2019 |
| JP | 2014514634 A | 6/2014 |

OTHER PUBLICATIONS

Chinese Patent Application No. 202110093187.4, English translation of first Office Action dated Mar. 8, 2021, 8 pages.
Chinese Patent Application No. 202110093187.4, first Office Action dated Mar. 8, 2021, 4 pages.
European Patent Application No. 21188743.5, Search and Opinion dated Jan. 26, 2022, 9 pages.
Indian Patent Application No. 202144034186, Office Action dated Aug. 8, 2022, 7 pages.
Japanese Patent Application No. 2021-122527, Office Action dated Sep. 6, 2022, 13 pages.
Japanese Patent Application No. 2021-122527, English translations of Office Action dated Sep. 6, 2022, 9 pages.

* cited by examiner

RENDERING METHOD, ELECTRONIC DEVICE AND STORAGE MEDIUM

CROSS-REFERENCE TO RELATED APPLICATIONS

This application claims the benefit of priority to Chinese Application No. 202110093187.4, filed on Jan. 25, 2021, the contents of which are incorporated herein by reference in their entirety.

TECHNICAL FIELD

The disclosure relates to the field of internet technologies, and in particular to a rendering method, a storage medium and an electronic device.

BACKGROUND

As functions of existing electronic devices, such as smart devices, continue to increase, there are more functional requirements for the smart devices. Therefore, more and more, richer and richer page content needs to be displayed on the smart devices. However, rich page content brings about problems such as a long loading time period.

SUMMARY

Embodiments of the disclosure aim to solve at least one of the technical solutions in the related art.

Accordingly, the disclosure provides the following technical solutions.

Embodiments of a first aspect of the disclosure provide a rendering method. The rendering method includes: obtaining data of a page to be processed; extracting a plurality of page elements from the data of the page to be processed; obtaining content and a plurality of attributes of each page element of the plurality of page elements; generating a rendering object set corresponding to each page element based on the content and the plurality of attributes of the page element, each rendering object set including a plurality of rendering objects; generating a rendering tree based on a plurality of rendering object sets corresponding respectively to the plurality of page elements; and performing a rendering process based on the rendering tree.

Embodiments of the second aspect of the disclosure provide an electronic device. The electronic device includes: a processor and a memory for storing instructions executable by the processor. The processor is configured to call and execute the instructions stored in the memory to implement the rendering method according to the embodiments of the first aspect of the disclosure.

Embodiments of the third aspect of the disclosure provide a non-transitory computer-readable storage medium, when program instructions stored in the storage medium are executed by a processor of an electronic device, the electronic device is caused to implement the rendering method according to the embodiments of the first aspect of the disclosure.

Additional aspects and advantages of embodiments of disclosure will be given in part in the following descriptions, become apparent in part from the following descriptions, or be learned from the practice of the embodiments of the disclosure.

DETAILED DESCRIPTION

Figure 1:
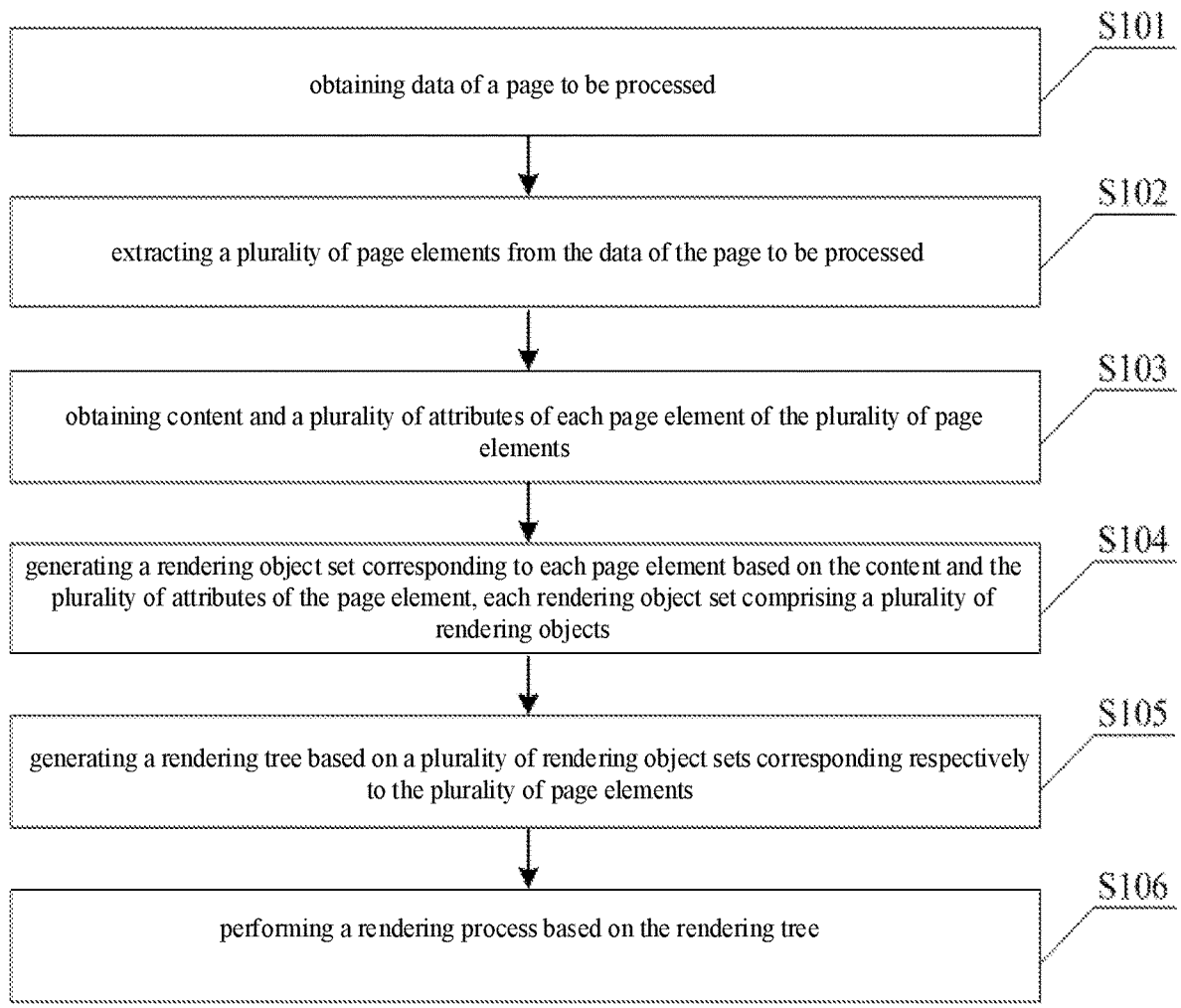
FIG. 1 is a flowchart of a rendering method according to an embodiment of the disclosure.

Reference will now be made in detail to exemplary embodiments, examples of which are illustrated in the accompanying drawings. The following description refers to the accompanying drawings, in which the same or similar reference numerals indicate the same or similar elements or elements with the same or similar functions. The embodiments described below with reference to the drawings are exemplary, and are intended to explain the disclosure, but should not be construed as limiting the disclosure.

In the related art, when rendering the page, a full-featured rendering object is established for each page element in the page, and all the functions required for rendering are realized through the rendering object, that is, the rendering object is applied to all possible attributes of the page element. For example, for a text-type page element, there are generally about 5 to 10 kinds of attributes of the text-type page element, and in order to achieve page rendering, the established rendering object needs to support all kinds of attributes. As a result, the rendering object is extremely burdensome, and establishment of the page element is slow.

A rendering method, a rendering apparatus, an electronic device and a storage medium of the embodiments of the disclosure are described below with reference to the accompanying drawings.

FIG. 1 is a flowchart of a rendering method according to an embodiment of the disclosure. The execution subject may be an electronic device. In detail, the electronic device may be but not limited to a computer or a mobile terminal, and the mobile terminal may be but not limited to a personal computer, a smart phone or a tablet computer (e.g., an iPad).

As illustrated in FIG. 1, the rendering method includes the following blocks S101-S106.

At block S101, data of a page to be processed is obtained.

In an embodiment, a page to be rendered may be referred to as the page to be processed. The page may be a browser of a website, a text page currently processed by a user, a text page has been processed by the user, or an application page on a terminal, a type of the page is not limited herein.

In detail, when the page to be processed needs to be rendered, a rendering request may be sent, so that the electronic device obtains the data of the page to be processed according to the rendering request, such as text data, image data, table data and video data. The rendering request may be sent by the user via interaction with a remote control, a button, a mouse, or through other operation methods such as touching, or may be automatically sent by the electronic device according to user's requirements, that is, the rendering request may be sent in response to monitoring a rendering requirement of the user for the page.

It should be noted that the data of the page to be processed may be at least one type of data, for example, the data may be only text data, or may be text data and image data, or may be text data, image data and video data, and a specific type of the data is not limited in the embodiments of the disclosure.

At block S102, a plurality of page elements are extracted from the data of the page to be processed.

It may be understood that the page element may be a basic element of a page, such as text, an image, a table and a hyperlink.

In detail, after the data of the page to be processed is obtained, the data may be parsed to extract the plurality of page elements from the data.

For example, if the data of the page is text data and image data, then a plurality of words or texts are extracted from the text data, and a plurality of words or images may be extracted from the image data, to obtain the plurality of page elements of the page to be processed.

At block S103, content and a plurality of attributes of each page element of the plurality of page elements are obtained.

The content of the page element refers to visually visible content contained in the page element, which may be the content contained in text, such as "colorful flowers are all over the garden", or the content contained in an image, such as animals, trees and flowers in the image.

The attributes of the page element include but are not limited to effect attributes, background attributes and color attributes. Different page elements may include different attributes, for example, when the page element is text, the attributes may include font size, color, background color and underline etc.

In an embodiment, an attribute library or an attribute table including the page elements and the plurality of attributes corresponding to the page elements may be preset, that is, the attribute library or the attribute table may include any page element and the plurality of attributes corresponding to the page element.

In detail, after obtaining the plurality of page elements, the content of each page element may be determined through a natural language processing technology, meanwhile, the plurality of attributes corresponding to the page element may be obtained by querying the preset attribute library or attribute table.

It should be noted that the method for obtaining the content and attributes of the page element at block S103 may also be other methods in the related art as long as block S103 may be implemented, which is not specifically limited in the embodiments of the disclosure.

At block S104, a rendering object set corresponding to each page element is generated based on the content and the plurality of attributes of the page element, each rendering object set includes a plurality of rendering objects.

In an embodiment, each attribute of the page element corresponds to a rendering object, such as a text attribute, a button attribute or a list attribute. Furthermore, the plurality of attributes of the page correspond respectively to the plurality of rendering objects (a rendering object set is formed of the plurality of rendering objects), and the plurality of page elements correspond respectively to the plurality of rendering object sets.

It should be noted that the ultimate goal of rendering a page element is to display content of the page element on the page in a rendering effect, for example, to display the content (an image) on the page in a "fly-in" manner. Therefore, rendering is performed in combination with the specific content of the page element. On the basis, in the embodiments of the disclosure, in combination with the content of the page element and the plurality of attributes corresponding to the page element, the plurality of rendering objects corresponding to the plurality of attributes may be generated. The plurality of rendering objects constitute a rendering object set of the page element.

At block S105, a rendering tree is generated based on a plurality of rendering object sets corresponding respectively to the plurality of page elements.

In an embodiment, the rendering tree may be generated based on the plurality of rendering objects included in the plurality of rendering object sets.

At block S106, a rendering process is performed based on the rendering tree.

Figure 2:
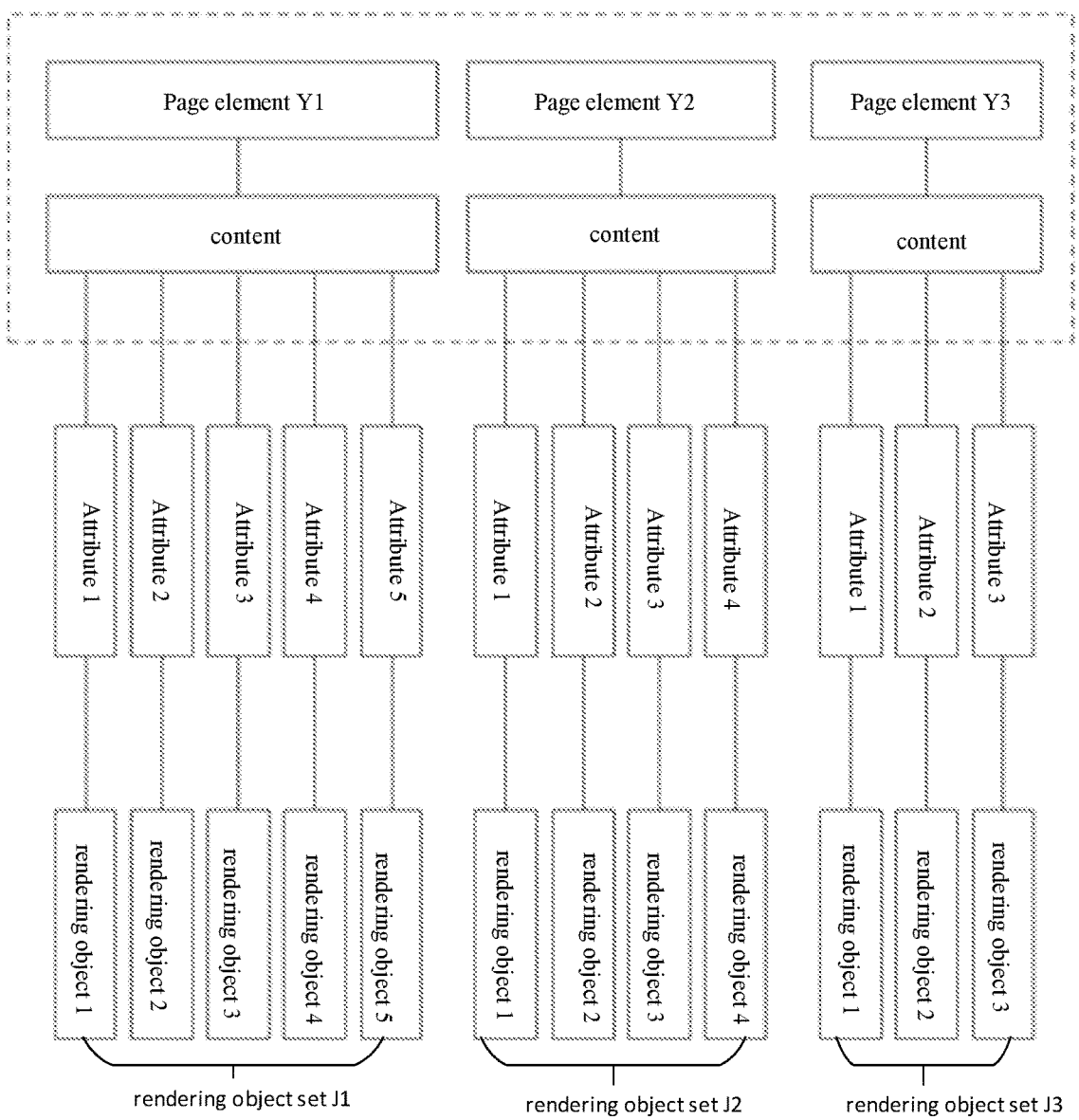
FIG. 2 is a schematic diagram of a correspondence between page elements and rendering objects according to an embodiment of the disclosure.

For example, as illustrated in FIG. 2, assume that the page to be processed includes 3 page elements Y1, Y2, Y3, Y1 corresponds to 5 attributes (an attribute 1 in FIG. 2 represents a first attribute), Y2 corresponds to 4 attributes, and Y3 corresponds to 3 attributes. Then a rendering object set J1 including 5 rendering objects corresponding to Y1 is generated (a rendering object 1 in FIG. 2 represents a first rendering object), a rendering object set J2 including 4 rendering objects corresponding to Y2 is generated, and a rendering object set J3 including 3 rendering objects corresponding to Y3 is generated. Furthermore, the three page elements Y1, Y2, and Y3 respectively correspond to the three rendering object sets J1, J2, and J3 (the three rendering object sets include 12 rendering objects). Afterwards, the rendering tree is generated based on the 12 rendering objects included in the three rendering object sets J1, J2 and J3, and then the 12 rendering objects are rendered based on the rendering tree, to achieve rendering of the page elements.

That is, the plurality of rendering objects are established for each page element, which improves a creation speed of rendering objects for the page element compared to creating a full-featured rendering object. For rendering of the page element, rendering may be simultaneously performed on the plurality of rendering objects corresponding to the page element, thereby improving the rendering speed of the page element and reducing the possibility of frame loss.

The rendering method of the embodiments of the disclosure does not need to create a full-featured rendering object for each page element, only the plurality of rendering objects corresponding to the plurality of attributes of the page element are required to be created. In the embodiment, each rendering object is responsible for one attribute, so that the number of created rendering objects corresponds to the number of attributes of the page element. Therefore, the creation speed of the rendering objects is significantly improved, the rendering speed of the page is improved, and the possibility of frame loss is reduced.

Figure 3:
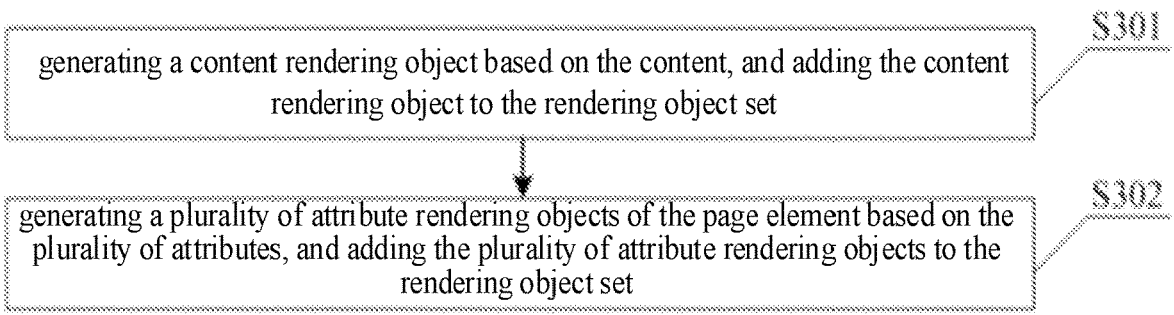
FIG. 3 is a flowchart of a process of generating a rendering object set according to an embodiment of the disclosure.

In an embodiment of the disclosure, as illustrated in FIG. 3, block S104 may include the following blocks S301 and S302.

At block S301, a content rendering object is generated based on the content of the page element, and the content rendering object is added to the rendering object set.

At step S302, a plurality of attribute rendering objects of the page element are generated based on the plurality of attributes, and the plurality of attribute rendering objects are added to the rendering object set.

In the embodiment of the present disclosure, the plurality of attribute rendering objects include more than one of: a display effect rendering object, an operation rendering object, an animation rendering object and a layout rendering object. The display effect rendering object is configured to render a display effect of the page element, for example, the display effect may be the flame effect. The operation rendering object is configured to render an operation of the page element, and the animation rendering object is configured to perform animation rendering on the page element, and the layout rendering object is used to perform layout rendering of the page element.

In detail, in the embodiment of the disclosure, an empty rendering object set may be preset. After the content and the plurality of attributes of each page element are obtained, the content rendering object is generated based on the content of the page element, and the content rendering object is added to the rendering object set, further an attribute rendering object is generated based on each attribute of the page element to generate the plurality of attribute rendering objects of the page element, and the plurality of attribute rendering objects of the page element are added to the rendering object set, thereby obtaining the rendering object set.

Figure 4:
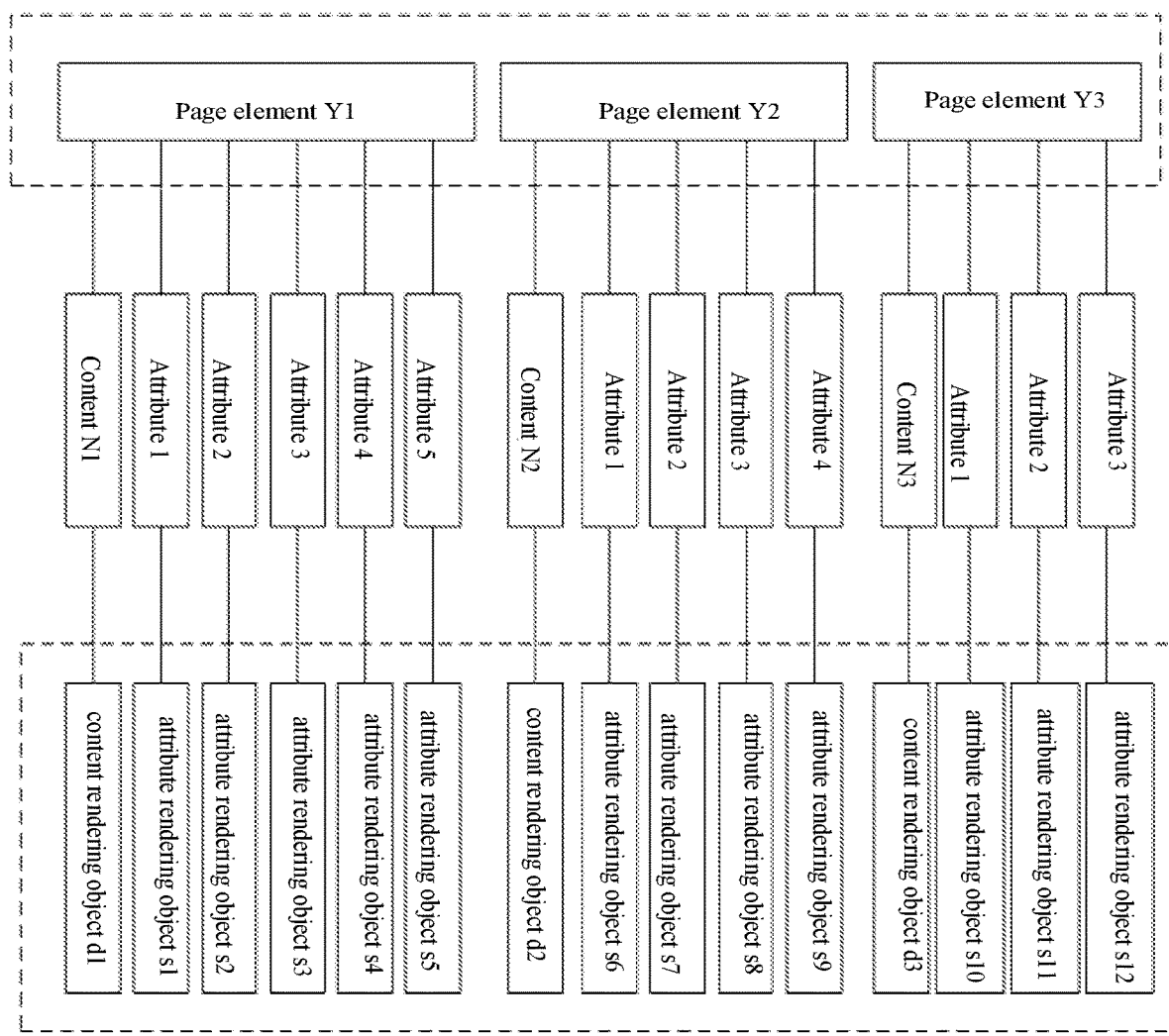
FIG. 4 is a schematic diagram of a correspondence between page elements and rendering objects according to an embodiment of the disclosure.

For example, as illustrated in FIG. 4, the three page elements Y1, Y2 and Y3 have contents N1, N2, and N3, respectively, Y1 corresponds to 5 attributes, Y2 corresponds to 4 attributes, and Y3 corresponds to 3 attributes. Then, a content rendering object d1 corresponding to the content N1 is generated, a content rendering object d2 corresponding to the content N2 is generated, a content rendering object d3 corresponding to the content N3 is generated, and the attribute rendering objects s1, s2, s3, s4, s5, s6, s7, s8, s9, s10, s11, and s12 corresponding respectively to the 12 attributes are generated. The content rendering object and the attribute rendering objects are added to the rendering object set, to generate the rendering object set {d1,d2,d3, s1,s2,s3,s4,s5,s6,s7,s8,s9,s10,s11,s12}.

Therefore, the generation of rendering objects based on the content and the attributes of the page element not only improves the creation speed of the rendering objects, but also ensures that all possible rendering effects are covered and the rendering objects are enriched.

After performing blocks S301 and S302, block S105 is executed. In the embodiment of the disclosure, the generation of the rendering tree at block S105 may be implemented according to an attribute grade and/or a content grade of the page element, or may be implemented according to a level of the page element, which will be described by the following example embodiments.

Figure 5:
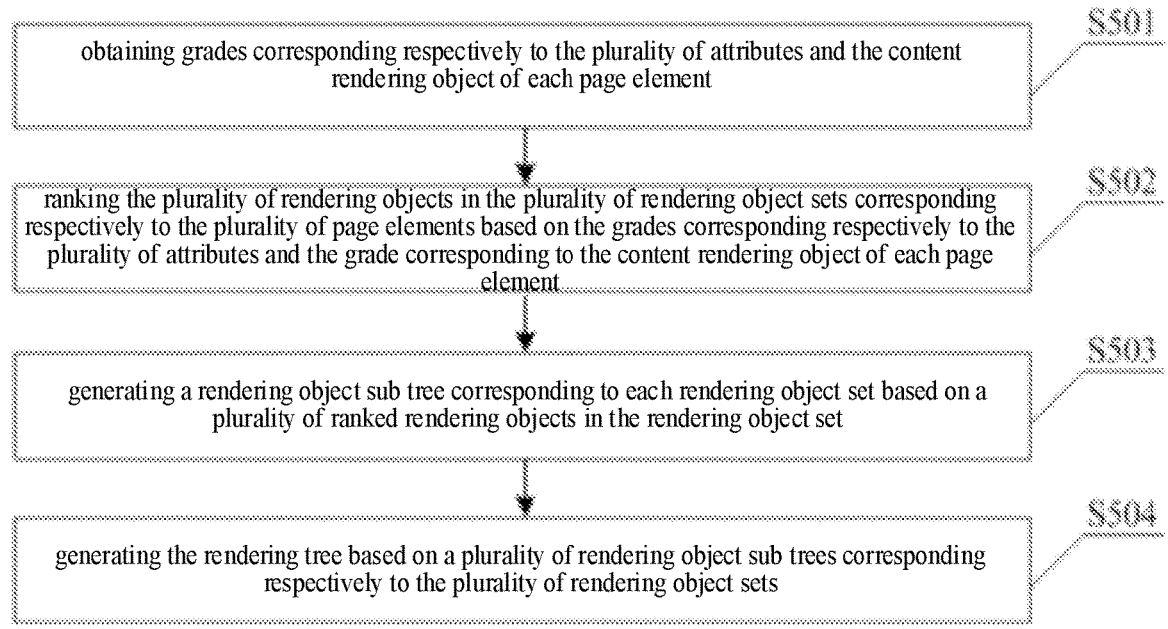
FIG. 5 is a flowchart of a process of generating a rendering tree according to an embodiment of the disclosure.

In an embodiment of the disclosure, as illustrated in FIG. 5, block S105 may include the following blocks S501 to S504.

At block S501, grades corresponding respectively to the plurality of attributes and the content rendering object of each page element are obtained.

In the embodiment of the disclosure, each of the plurality of attributes of each page element corresponds to a grade, and the grade corresponding to the attribute may be used to characterize an importance of the attribute, and the importance corresponds to a rendering order of the attribute. The content rendering object corresponding to each page element corresponds to a grade, and the grade corresponding to the content rendering object is used to characterize a rendering order of the page element.

In detail, an attribute grade library or an attribute grade table including any attribute and a corresponding grade may be preset, so that after obtaining the plurality of attributes corresponding to each page element, the plurality of grades corresponding respectively to the plurality of attributes may be obtained by querying the attribute grade library or attribute grade table. It is also possible to preset a content grade library including any content rendering object and a corresponding grade, so that after obtaining the plurality of content rendering objects corresponding respectively to the page elements, the grades corresponding respectively to the plurality of content rendering objects may be obtained by querying the content grade library.

In addition, the grades corresponding to the plurality of attributes and the content rendering objects may also be set according to actual user requirements. That is, after the plurality of attributes and the content rendering objects are determined, the grades of the plurality of attributes and the grades of the plurality of content rendering objects are set according to actual user requirements.

At block S502, the plurality of rendering objects in the plurality of rendering object sets corresponding respectively to the plurality of page elements are ranked based on the grades corresponding respectively to the plurality of attributes and the grade corresponding to the content rendering object of each page element.

In detail, the plurality of content rendering objects in the rendering object sets may be ranked according to the grades of the plurality of content rendering objects, and then the plurality of attribute rendering objects in each rendering object set are ranked according to the grades corresponding to the plurality of attributes corresponding to each page element. When ranking, the higher the grade, the higher the rendering order, and thus the prior the ranking, and conversely, the lower the grade, the lower the rendering order, and thus the posterior the ranking.

At block S503, a rendering object sub tree corresponding to each rendering object set is generated based on the plurality of ranked rendering objects in the rendering object set.

After ranking the plurality of rendering objects in the rendering object set corresponding to each page element, the plurality of ranked rendering objects are obtained. According to the plurality of ranked rendering objects in each rendering object set, a rendering object sub tree corresponding to each rendering object set is generated, to generate the plurality of rendering object sub trees.

At block S504, the rendering tree is generated based on a plurality of rendering object sub trees corresponding respectively to the plurality of rendering object sets.

Figure 6:
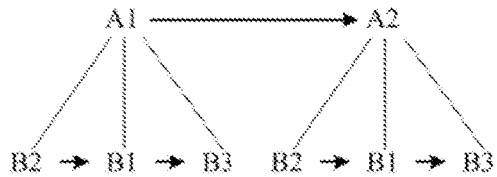
FIG. 6 is a schematic diagram of a rendering tree according to an embodiment of the disclosure.

For example, assume that the page has two content rendering objects A1, A2, and two page elements each corresponds to three attributes b1, b2, and b3, the corresponding attribute rendering objects are B1, B2, B3, and for the grades of A1 and A2, A1 is higher than A2, the corresponding grades of b1, b2, and b3 are b2→b1→b3 from high to low. Then, rendering objects in the plurality of rendering objects are ranked based on the rendering order. The rendering tree shown in FIG. 6 is generated according to the plurality of ranked rendering objects, and the page is rendered according to the rendering tree.

Figure 7:
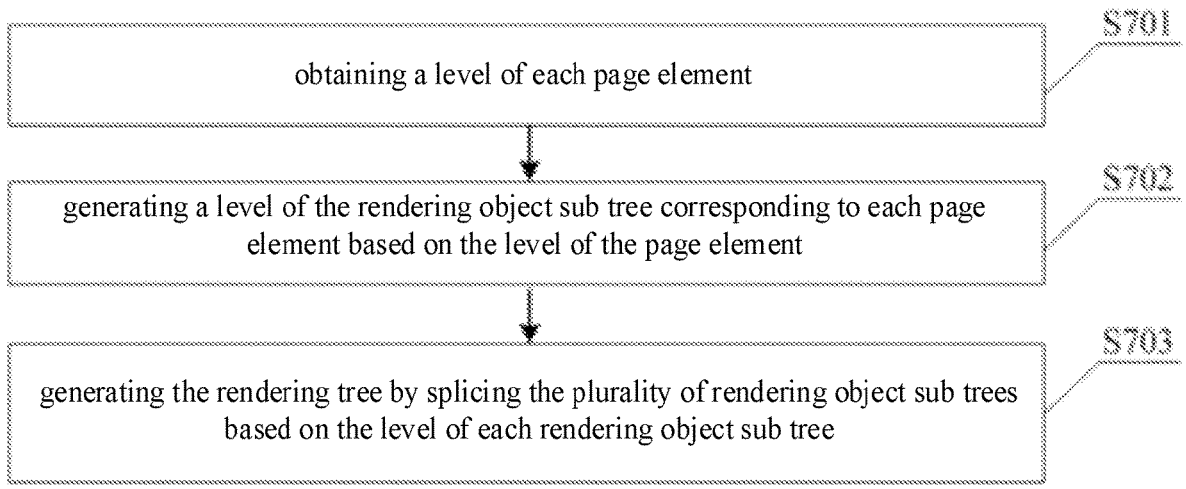
FIG. 7 is a flowchart of a process of generating a rendering tree from a plurality of rendering object sub trees according to an embodiment of the disclosure.

In an embodiment of the disclosure, as illustrated in FIG. 7, block S504 may include the following blocks S701 to S703.

At block S701, a level of each page element is obtained.

In the embodiment of the disclosure, each page element may be processed hierarchically, that is, each page element includes a plurality of levels. For example, the levels of page element text from top to bottom are: background color, scenery, touch operation event processing layer, transparency processing layer, pressing effect layer, shadow layer, page layout layer (padding, margin and border).

After the page element is obtained, the level to which the corresponding attribute belongs may be determined.

It may be understood that the above embodiment of the page is only an example, and does not constitute a limitation to the disclosure. In an actual implementation, the levels of page elements may be determined in any way according to requirements, and details are not described herein again.

At block S702, a level of the rendering object sub tree corresponding to each page element is generated based on the level of the page element.

The level of each page element may be determined as the level of the rendering object sub tree corresponding to the page element. In this way, the levels corresponding to the plurality of the rendering object sub trees are obtained.

At block S703, the rendering tree is generated by splicing the plurality of rendering object sub trees based on the level of each rendering object sub tree. The splicing may be carried out in a hierarchical order from bottom to top.

For example, if the levels of page elements W1, W2, and W3 are a first level, a second level and a third level respectively, it is determined that the level of the rendering object sub tree U1 corresponding to W1 is the first level, the level of the rendering object sub tree U2 corresponding to W2 is the second level, and the level of the rendering object sub tree U3 corresponding to W3 is the third level. Furthermore, U1, U2, and U3 are spliced according to the first, second, and third levels, that is, U1, U2, and U3 are spliced in sequence, and after the splicing is completed, the rendering tree is generated.

Thus, the rendering object sub trees are generated according to the grades of the attributes and the content rendering objects, and the rendering tree is generated according to the rendering object sub trees based on the levels of the plurality of page elements, which improves the reliability of the rendering tree, thereby ensuring the reliability of rendering.

It should be noted that the user can edit the page element in the page, for example, add, delete and modify the page element, which causes the page element in the page to be updated. In the embodiment of the disclosure, in order to render based on the updated page element, the following embodiments are proposed.

In an embodiment, the rendering method further includes: obtaining an updated attribute of an updated page element, when the page to be processed has at least one page element updated; obtaining a rendering object sub tree corresponding to the updated page element; and obtaining a rendering object corresponding to the updated attribute, and updating the rendering object sub tree corresponding to the updated page element.

In detail, the page to be processed is monitored in real time to monitor whether the page element in the page is updated, such as by operations of addition, deletion, modification. When it is monitored that the page element is updated, the updated attribute of the updated page element is obtained and an attribute type (such as adding, deleting or modifying the attribute) is determined, and then the rendering object sub tree corresponding to the updated page element is obtained. The rendering object corresponding to the updated attribute is obtained, and the corresponding rendering object sub tree is updated.

That is, when a certain page element is added, a new rendering object sub tree is generated for the page element through the rendering method of the embodiment of the disclosure. When a certain page element is deleted, the rendering object sub tree corresponding to the page element is deleted. When a certain page element is modified, a new rendering object sub tree is generated by the rendering method of the embodiment of the disclosure for the modified page element, and the rendering object sub tree corresponding to the page element before modification is deleted at the same time. In this way, the rendering object sub tree is updated, the rendering tree is updated based on the updated rendering object sub tree, such that the updated rendering tree is generated, and the updated page is rendered according to the updated rendering tree. Therefore, when the page element is changed, the rendering tree is updated, which realizes the real-time update of the rendering object of the page element, and ensures the integrity and reliability of page rendering.

It should be noted that, in the related art, since rendering of page elements is serial, the rendering of the page may be slow, which increases the possibility of frame loss and may easily lead to stuttering. In the embodiments of the disclosure, the plurality of rendering objects are established for each page element, and the plurality of rendering objects constitute a rendering object set. That is, the plurality of page elements correspond to the plurality of rendering object sets. When rendering, the plurality of rendering object sets corresponding to the page are rendered in parallel, to speed up the rendering speed, reduce the possibility of frame loss, and reduce or avoid occurrence of jams. In an embodiment of the disclosure, the rendering method may further include: performing parallel rendering on the plurality of rendering object sets corresponding to the plurality of page elements. Each page element corresponds to a rendering object set.

In detail, after the rendering object set corresponding to each page element is generated according to the content and the plurality of attributes of each page element, the plurality of rendering object sets corresponding to the plurality of page elements are rendered in parallel to realize parallel rendering of the plurality of page elements. Compared with the serial rendering in the related art, the rendering speed is accelerated, the possibility of frame loss is reduced, and occurrence of jams is reduced or avoided.

For example, if the page to be processed includes 3 page elements Y1, Y2, Y3, where Y1 corresponds to 5 attributes, Y2 corresponds to 3 attributes, and Y3 corresponds to 3 attributes, then a rendering object set J1 including 5 rendering objects corresponding to Y1 is generated, a rendering object set J2 including 4 rendering objects corresponding to Y2 is generated, and a rendering object set J3 including 3 rendering objects corresponding to Y3 is generated. Furthermore, the three page elements Y1, Y2, and Y3 respectively correspond to the three rendering object sets J1, J2, and J3 (the three rendering object sets include 12 rendering objects). Afterwards, the rendering tree is generated based on the 12 rendering objects included in the 3 rendering object sets J1, J2, and J3, and then the 12 rendering objects are rendered in parallel based on the rendering tree, to achieve parallel rendering of the page elements Y1, Y2, and Y3.

Therefore, rendering is performed in parallel, so that the rendering speed is speeded up, the possibility of frame loss is reduced, and occurrence of jams is reduced or avoided.

Figure 8:
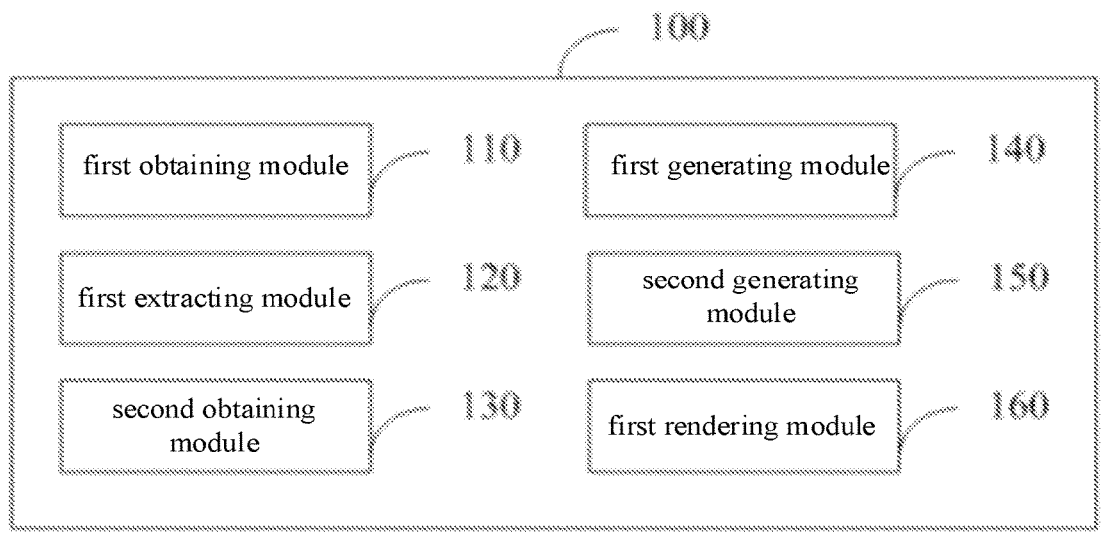
FIG. 8 is a block diagram of a rendering apparatus according to an embodiment of the disclosure.

The embodiments of the disclosure provide a rendering apparatus. FIG. 8 is a block diagram of a rendering apparatus according to an embodiment of the disclosure.

As illustrated in FIG. 8, the rendering apparatus 100 includes: a first obtaining module 110, a first extracting module 120, a second obtaining module 130, a first generating module 140, a second generating module 150, and a first rendering module 160.

The first obtaining module 110 is configured to obtain data of a page to be processed. The first extracting module 120 is configured to extract a plurality of page elements from the data of the page to be processed. The second obtaining module 130 is configured to obtain content and a plurality of attributes of each page element of the plurality of page elements. The first generating module is configured to generate a rendering object set corresponding to each page element based on the content and the plurality of attributes of the page element, each rendering object set including a plurality of rendering objects. The second generating module 150 is configured to generate a rendering tree based on a plurality of rendering object sets corresponding respectively to the plurality of page elements. The first rendering module 160 is configured to perform a rendering process based on the rendering tree.

In an embodiment, the first generating module 140 includes: a first generating unit and a second generating unit. The first generating unit is configured to generate a content rendering object based on the content, and add the content rendering object to the rendering object set. The second generating unit is configured to generate a plurality of attribute rendering objects of the page element based on the plurality of attributes, and add the plurality of attribute rendering objects to the rendering object set.

In an embodiment, the second generating module 150 includes: a first obtaining unit, a first ranking unit, a third generating unit and a fourth generating unit.

The first obtaining unit is configured to obtain grades corresponding respectively to the plurality of attributes and the content rendering object. The first ranking unit is configured to rank the plurality of rendering objects in the rendering object set corresponding to the page element based on the grades corresponding respectively to the plurality of attributes and the grade corresponding to the content rendering object. The third generating unit is configured to generate a rendering object sub tree corresponding to each rendering object set based on a plurality of ranked rendering objects in the rendering object set. The fourth generating unit is configured to generate the rendering tree based on a plurality of rendering object sub trees corresponding respectively to the plurality of rendering object sets.

In an embodiment, the fourth generating unit is further configured to: obtain a level of each page element; generate a level of the rendering object sub tree corresponding to each page element based on the level of the page element; and generate the rendering tree by splicing the plurality of rendering object sub trees based on the level of each rendering object sub tree.

In an embodiment, the rendering apparatus 100 further includes: a third obtaining module, a fourth obtaining module and a fifth obtaining module. The third obtaining module is configured to obtain an updated attribute of an updated page element, when the page to be processed has at least one page element updated. The fourth obtaining module is configured to obtain a rendering object sub tree corresponding to the updated page element. The fifth obtaining module is configured to obtain a rendering object corresponding to the updated attribute, and update the rendering object sub tree corresponding to the updated page element.

In an embodiment, the plurality of attribute rendering objects includes more than one of: a display effect rendering object, an operation rendering object, an animation rendering object, and a layout rendering object.

In an embodiment, the rendering apparatus 100 further includes: a second rendering module, configured to perform a parallel rendering process on the plurality of rendering object sets corresponding respectively to the plurality of page elements.

It should be noted that the specific implementation manner of the rendering apparatus may be referred to the specific implementation manner of the foregoing rendering method. To avoid redundancy, details are not described herein again.

The rendering apparatus of the embodiments of the disclosure renders the page based on the content and attributes of the page element, without creating a full-featured rendering object for each page element, and only the plurality of rendering objects corresponding to the plurality of attributes of the page element are required to be created, which improves creation speed of the rendering objects, and in turn improves rendering speed of the page.

Figure 9:
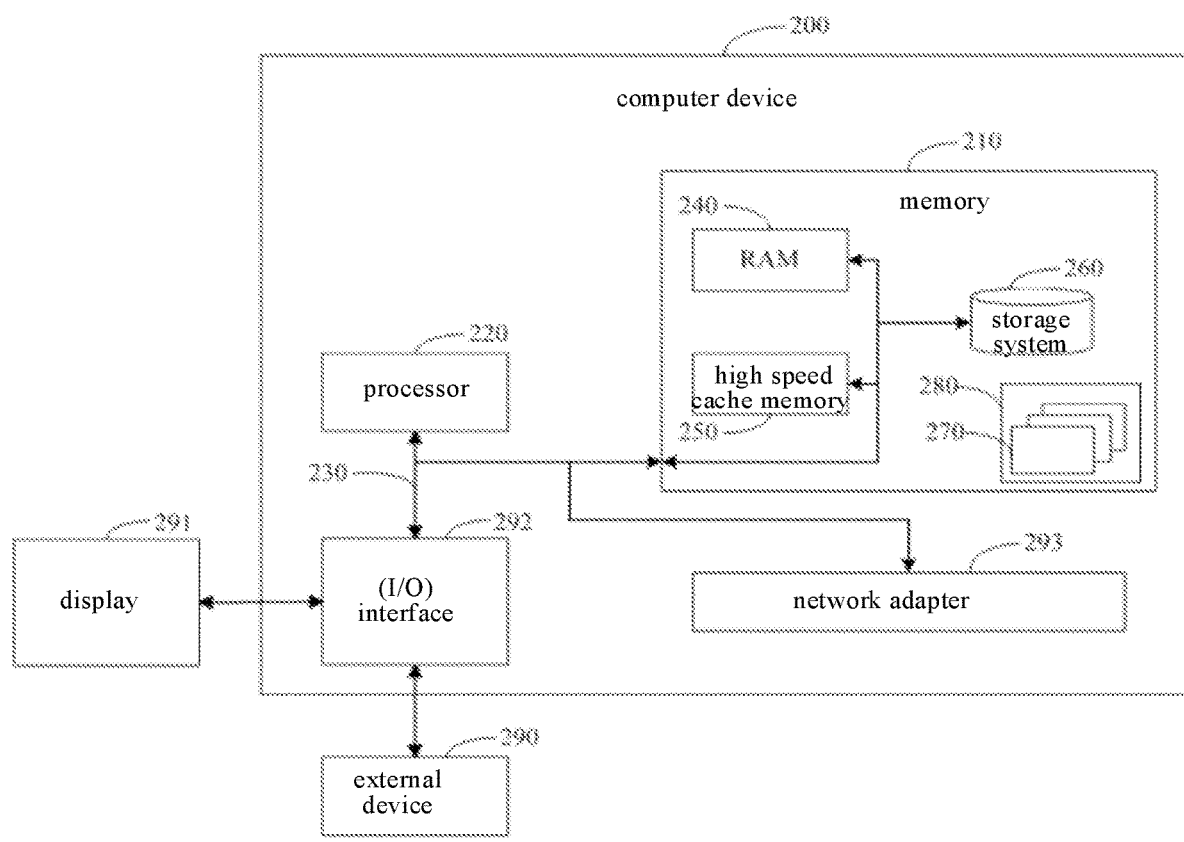
FIG. 9 is a block diagram of an electronic device according to an embodiment of the disclosure.

FIG. 9 is a block diagram of an electronic device according to an embodiment of the disclosure.

As illustrated in FIG. 9, the electronic device 200 includes a memory 210 and a processor 220, and a bus 230 connecting different components (including the memory 210 and the processor 220).

The memory 210 is configured to store executable instructions of the processor 220. The processor 201 is configured to call and execute the executable instructions stored in the memory 202 to implement the rendering method in the above embodiments of the disclosure.

The bus 230 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 200 typically includes a variety of computer system readable media. These media may be any available media accessible by the computer device 200 and includes both volatile and non-volatile media, removable and non-removable media.

The system memory 210 may include a computer system readable medium in the form of volatile memory, such as a random access memory (hereinafter referred to as RAM) 240 and/or a high speed cache memory 250. The computer device 200 may further include other removable or non-removable, volatile or non-volatile computer system storage media. By way of example only, the storage system 260 may be configured to read and write a non-removable and non-volatile magnetic media (not shown in FIG. 9, commonly referred to as a "hard drive"). Although not shown in FIG. 7, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 230 via one or more data medium interfaces. The memory 210 may include at least one program product. The program product has a set (such as, at least one) of program modules configured to perform the functions of various embodiments of the disclosure.

A program/utility 280 having a set (at least one) of the program modules 270 may be stored in, for example, the memory 210. The program modules 270 include but are not limited to, an operating system, one or more application programs, other programs modules, and program data. Each of these examples, or some combination thereof, may include an implementation of a network environment. The program modules 270 generally perform the functions and/or methods in the embodiments described herein.

The computer device 200 may also communicate with one or more external devices 290 (such as, a keyboard, a pointing device, a display 291, etc.). Furthermore, the computer device 200 may also communicate with one or more communication devices enabling a user to interact with the computer device 200 and/or other devices (such as a network card, modem, etc.) enabling the computer device 200 to communicate with one or more computer devices. This communication can be performed via the input/output (I/O) interface 292. Also, the computer device 200 may communicate with one or more networks (such as a local area network (hereafter referred to as LAN), a wide area network (hereafter referred to as WAN) and/or a public network such as an Internet) through a network adapter 293. As shown, the network adapter 293 communicates with other modules of the computer device 200 over the bus 230. It should be understood that, although not shown, other hardware and/or software modules may be used in connection with the computer device 200. The hardware and/or software includes, but is not limited to, microcode, device drivers, redundant processing units, external disk drive arrays, RAID systems, tap drive and data backup storage system.

The processor 220 is configured to execute various functional applications and data processing by running programs stored in the memory 210.

It should be noted that, for the implementation process of the electronic device of the embodiments of the disclosure, refer to the foregoing explanation of the rendering method of the embodiments of the disclosure, and details are not described herein again.

The electronic device of the embodiments of the disclosure renders the page based on the content and the attributes of the page element, without creating a full-featured rendering object for each page element, and only the plurality of rendering objects corresponding to the plurality of attributes of the page element are required to be created, which improves creation speed of the rendering objects, in turn improves rendering speed of the page, and reduces the possibility of frame loss.

In order to implement the above embodiments, the embodiments of the disclosure also provide a non-transitory computer-readable storage medium. When the instructions in the storage medium are executed by the processor of the electronic device, the electronic device is caused to execute the rendering method.

In order to implement the above embodiments, the embodiments of the disclosure also provide a computer program product, when the computer program product is executed by a processor of an electronic device, the electronic device is enabled to execute the rendering method.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only.

It will be appreciated that the disclosure is not limited to the exact construction that has been described above and illustrated in the accompanying drawings, and that various modifications and changes can be made without departing from the scope thereof.

What is claimed is:

1. A rendering method, comprising:
   obtaining data of a page to be processed;
   extracting a plurality of page elements from the data of the page to be processed;
   obtaining content and a plurality of attributes of each page element of the plurality of page elements;
   generating a plurality of rendering objects sets, each rendering object set of the plurality of rendering object sets correspond to each page element based on the content and the plurality of attributes of the respective page element, each rendering object set comprising a plurality of rendering objects, the plurality of rendering objects comprise a content rendering object based on the content, and a plurality of attribute rendering objects based on the plurality of attributes;
   generating a rendering tree based on the plurality of rendering objects sets corresponding respectively to the plurality of page elements comprising:
   obtaining grades corresponding respectively to the plurality of attributes and the content rendering object of each page element wherein the grades indicate an importance associated with a rendering order for each of the plurality of attributes and the content rendering object;
   ranking the plurality of rendering objects in the plurality of rendering object sets corresponding respectively to the plurality of page elements based on the grades corresponding respectively to the plurality of attributes and the grades corresponding to the content rendering object of each page element;
   generating a rendering object sub tree corresponding to each rendering object set including the rankings of the plurality of ranked rendering objects in the rendering object set; and
   generating the rendering tree including the plurality of rendering object sub trees corresponding respectively to the plurality of rendering object sets; and
   performing a rendering process based on the rendering tree.

2. The method of claim 1, wherein generating the rendering tree based on the plurality of rendering object sub trees corresponding respectively to the plurality of rendering object sets, comprises:
   obtaining a level of each page element;
   generating a level of the rendering object sub tree corresponding to each page element based on the level of the page element; and
   generating the rendering tree by splicing the plurality of rendering object sub trees based on the level of each rendering object sub tree.

3. The method of claim 1, further comprising:
   obtaining an updated attribute of an updated page element, when the page to be processed has at least one page element updated;
   obtaining a rendering object sub tree corresponding to the updated page element; and obtaining a rendering object corresponding to the updated attribute, and updating the rendering object sub tree corresponding to the updated page element.

4. The method of claim 1, wherein the plurality of attribute rendering objects comprise more than one of: a display effect rendering object, an operation rendering object, an animation rendering object, and a layout rendering object.

5. The method of claim 1, further comprising:
performing a parallel rendering process on the plurality of rendering object sets corresponding respectively to the plurality of page elements.

6. An electronic device, comprising:
a processor; and
a memory for storing executable instructions of the processor; wherein,
the processor is configured to call and execute the executable instructions stored in the memory to implement the rendering method comprising:
obtaining data of a page to be processed;
extracting a plurality of page elements from the data of the page to be processed;
obtaining content and a plurality of attributes of each page element of the plurality of page elements;
generating a plurality of rendering objects sets, each rendering object set of the plurality of rendering object sets correspond to each page element based on the content and the plurality of attributes of the respective page element, each rendering object set comprising a plurality of rendering objects, the plurality of rendering objects comprise a content rendering object based on the content and a plurality of attribute rendering objects based on the plurality of attributes;
generating a rendering tree based on the plurality of rendering objects sets corresponding respectively to the plurality of page elements comprising:
obtaining grades corresponding respectively to the plurality of attributes and the content rendering object of each page element wherein the grades indicate an importance associated with a rendering order for each of the plurality of attributes and the content rendering object;
ranking the plurality of rendering objects in the plurality of rendering object sets corresponding respectively to the plurality of page elements based on the grades corresponding respectively to the plurality of attributes and the grades corresponding to the content rendering object of each page element;
generating a rendering object sub tree corresponding to each rendering object set including the rankings of the plurality of ranked rendering objects in the rendering object set; and
generating the rendering tree including the plurality of rendering object sub trees corresponding respectively to the plurality of rendering object sets;
performing a rendering process based on the rendering tree.

7. The electronic device of claim 6, wherein generating the rendering tree based on the plurality of rendering object sub trees corresponding respectively to the plurality of rendering object sets, comprises:
obtaining a level of each page element;
generating a level of the rendering object sub tree corresponding to each page element based on the level of the page element; and generating the rendering tree by splicing the plurality of rendering object sub trees based on the level of each rendering object sub tree.

8. The electronic device of claim 6, wherein the processor is further configured to call and execute the executable instructions to implement operations of:
obtaining an updated attribute of an updated page element, when the page to be processed has at least one page element updated;
obtaining a rendering object sub tree corresponding to the updated page element; and
obtaining a rendering object corresponding to the updated attribute, and updating the rendering object sub tree corresponding to the updated page element.

9. The electronic device of claim 6, wherein the plurality of attribute rendering objects comprise more than one of: a display effect rendering object, an operation rendering object, an animation rendering object, and a layout rendering object.

10. The electronic device of claim 6, wherein the processor is further configured to call and execute the executable instructions to implement an operation of:
performing a parallel rendering process on the plurality of rendering object sets corresponding respectively to the plurality of page elements.

11. A non-transitory computer-readable storage medium, wherein the instructions in the storage medium are executed by the processor of the electronic device, the electronic device is caused to implement the rendering method comprising:
obtaining data of a page to be processed;
extracting a plurality of page elements from the data of the page to be processed;
obtaining content and a plurality of attributes of each page element of the plurality of page elements;
generating a plurality of rendering objects sets, each rendering object set of the plurality of rendering object sets correspond to each page element based on the content and the plurality of attributes of the respective page element, each rendering object set comprising a plurality of rendering objects, the plurality of rendering objects comprise a content rendering object based on the and a plurality of attribute rendering objects based on the plurality of attributes;
generating a rendering tree based on the plurality of rendering objects sets corresponding respectively to the plurality of page elements comprising:
obtaining grades corresponding respectively to the plurality of attributes and the content rendering object of each page element wherein the grades indicate an importance associated with a rendering order for each of the plurality of attributes and the content rendering object;
ranking the plurality of rendering objects in the plurality of rendering object sets corresponding respectively to the plurality of page elements based on the grades corresponding respectively to the plurality of attributes and the grades corresponding to the content rendering object of each page element;
generating a rendering object sub tree corresponding to each rendering object set including the rankings of the plurality of ranked rendering objects in the rendering object set; and
generating the rendering tree including the plurality of rendering object sub trees corresponding respectively to the plurality of rendering object sets;

performing a rendering process based on the rendering tree.

12. The storage medium of claim 11, wherein generating the rendering tree based on the plurality of rendering object sub trees corresponding respectively to the plurality of rendering object sets, comprises:
    obtaining a level of each page element;
    generating a level of the rendering object sub tree corresponding to each page element based on the level of the page element; and
    generating the rendering tree by splicing the plurality of rendering object sub trees based on the level of each rendering object sub tree.

13. The storage medium of claim 11, wherein the processor is further configured to call and execute the executable instructions to implement operations of:
    obtaining an updated attribute of an updated page element, when the page to be processed has at least one page element updated;
    obtaining a rendering object sub tree corresponding to the updated page element; and
    obtaining a rendering object corresponding to the updated attribute, and updating the rendering object sub tree corresponding to the updated page element.

14. The storage medium of claim 11, wherein the plurality of attribute rendering objects comprise more than one of: a display effect rendering object, an operation rendering object, an animation rendering object, and layout rendering object.

* * * * *